Figure 1:
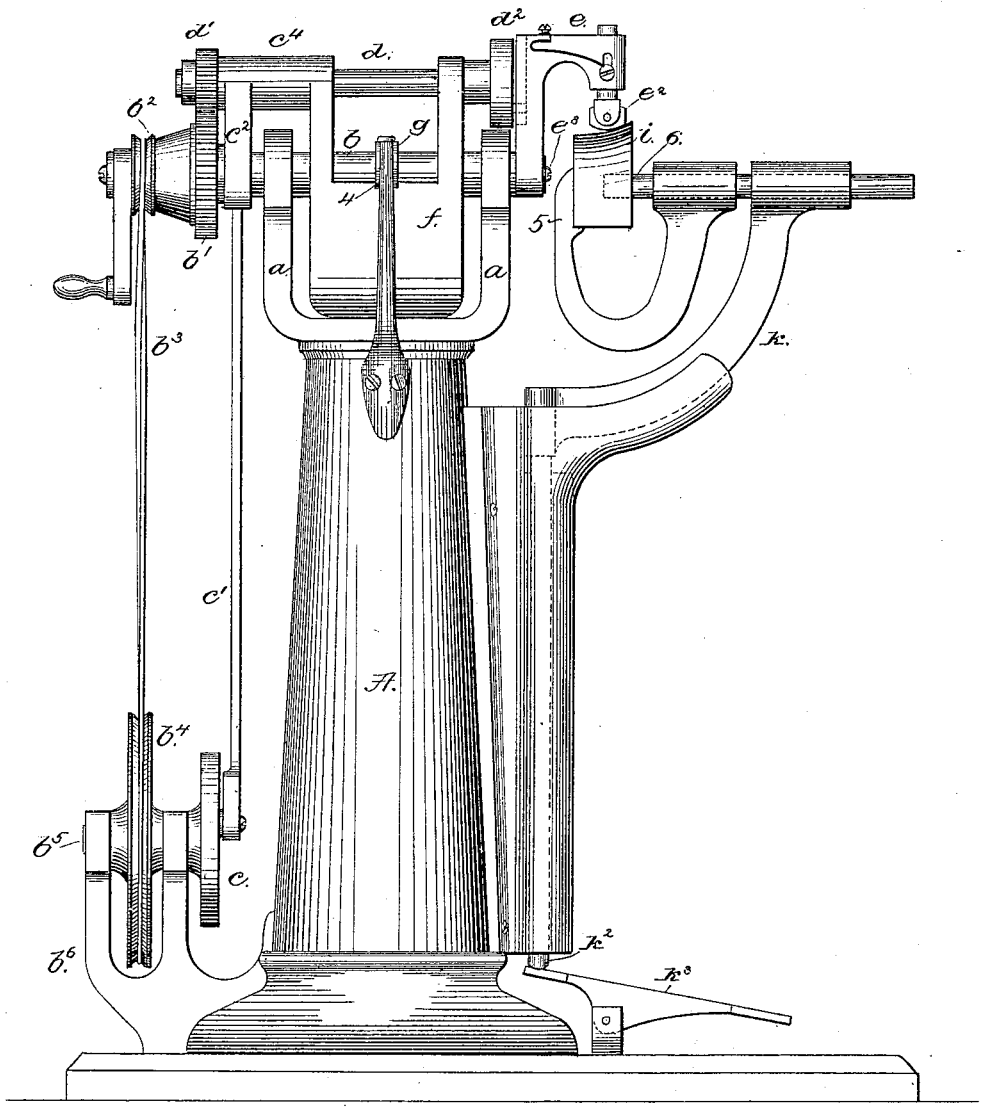

(No Model.)  2 Sheets—Sheet 1.

J. G. BUZZELL.
BURNISHING MACHINE FOR BOOTS AND SHOES.

No. 263,284.  Patented Aug. 22, 1882.

(No Model.) 2 Sheets—Sheet 2.
J. G. BUZZELL.
BURNISHING MACHINE FOR BOOTS AND SHOES.
No. 263,284. Patented Aug. 22, 1882.
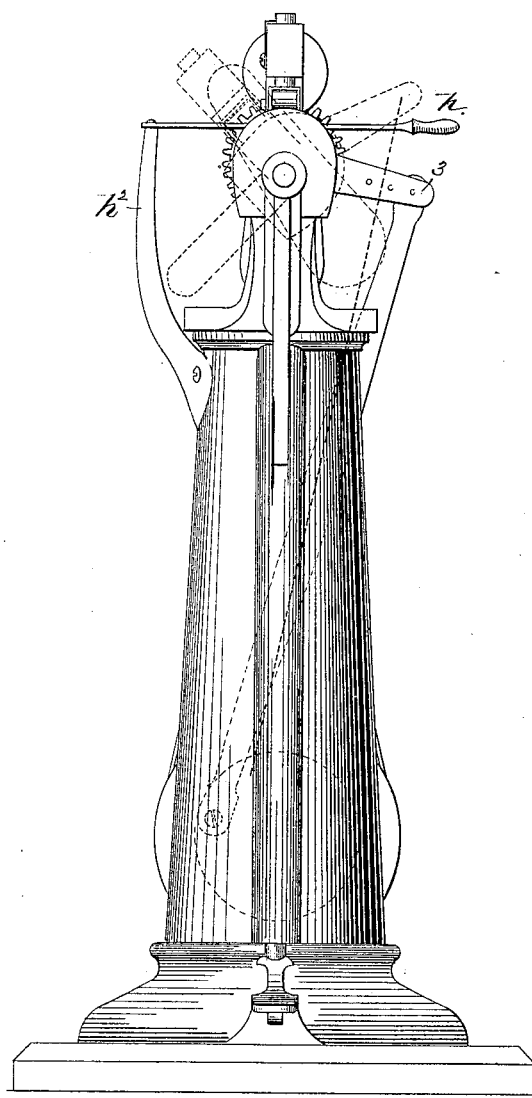
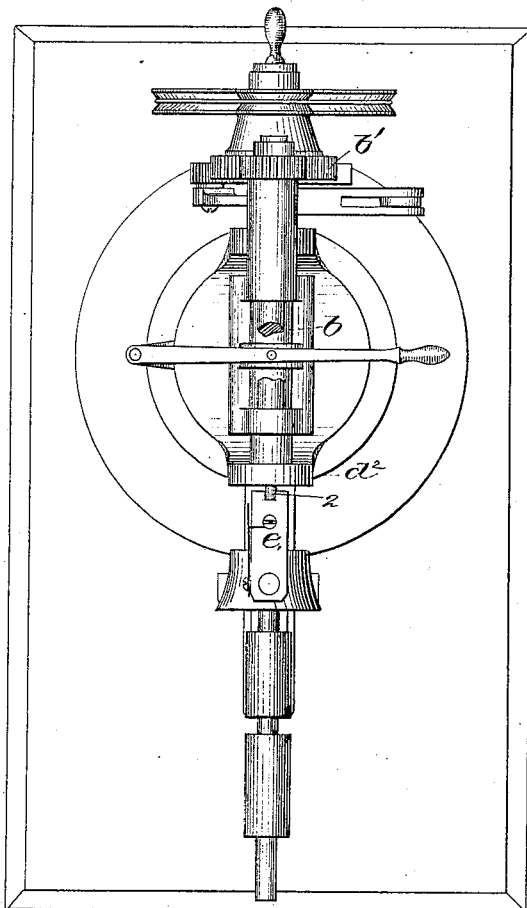

UNITED STATES PATENT OFFICE.

JOHN G. BUZZELL, OF LYNN, ASSIGNOR TO THEODORE A. DODGE, TRUSTEE, OF CAMBRIDGE, MASSACHUSETTS.

BURNISHING-MACHINE FOR BOOTS AND SHOES.

SPECIFICATION forming part of Letters Patent No. 263,284, dated August 22, 1882.

Application filed January 7, 1882. (No model.)

*To all whom it may concern:*

Be it known that I, JOHN G. BUZZELL, of Lynn, county of Essex, and State of Massachusetts, have invented an Improvement in Burnishing-Machines for Boots and Shoes, of which the following description, in connection with the accompanying drawings, is a specification.

This invention in burnishing-machines has for its object to give to the burnishing-tool a movement more in accordance with that given to a hand-tool operated by the hand of a workman.

My invention is shown embodied in a burnishing-machine containing a shoe-supporting jack capable of being rotated by hand and of being pressed up against the tool by means of a treadle actuated by the workman.

In this my improved machine the burnishing-tool is carried by an arm extending from a main rotating shaft, upon which the said arm is loosely mounted, or the said arm may have its fulcrum in line with the said shaft. This arm, grooved at its rear side, receives a crank-pin of a rapidly-rotating secondary shaft having its bearings in a weighted or counterbalanced yoke or frame having for its fulcrum the main shaft, on which the tool-carrying arm has its fulcrum, the two shafts being parallel. The secondary shaft having the crank-pin also has a bearing in an elbow-shaped bearing-block, having its axis of motion on the main shaft; and the said bearing-block is connected by a link with a crank-pin on the prime-motor shaft which imparts motion to the main shaft of the machine. The main shaft, driven by a belt or otherwise from the prime-motor shaft, has on it a toothed gear, which engages the teeth of a small pinion on the secondary shaft which carries the crank-pin referred to, and rotates the secondary shaft very rapidly, so that the tool-carrying arm in engagement with the crank-pin is reciprocated rapidly for a distance equal to the throw of the said crank-pin, and at the same time the said tool-carrying arm, by the changing position of the bearing for the secondary shaft through the bearing-block, link, and crank referred to, is made to gradually but slowly move about the heel for a distance very much in excess of the throw of the said arm by the crank-pin of the secondary shaft. As the result of this action, the tool-carrying arm has a long vibration or reciprocation in a certain defined arc, and as it is being moved over said arc at one speed it is rapidly reciprocated backward and forward in the same arc, but with short, quick strokes, thus producing a compound vibratory and reciprocatory motion over unequal or varying arcs. This movement of a burnishing-tool is applicable to any burnishing-tool wherein curved or cylindrical bodies are to be burnished or rubbed. The shaft carrying the vibrating arm and the shaft having the crank-pin for reciprocating it are held in such manner as to be moved longitudinally by means of a suitable lever in order to enable the tool to travel on all parts of the heel, considered with relation to its length.

Figure 1 represents in side elevation a shoe-heel burnishing-machine containing my invention; Fig. 2, a front elevation thereof, and Fig. 3 a top view.

The frame-work A, of suitable shape to sustain the working parts, has bearings $a$ $a$ to receive the main rotating shaft $b$, which has secured to it the toothed gear $b'$.

The shaft $b$ has a grooved pulley, $b^2$, which receives a belt, $b^3$, extended over a pulley, $b^4$, on a shaft, $b^5$, which I call the "prime-motor shaft," as it will be driven by power in any usual way and transmit its motion to the working parts of the burnishing-machine. This shaft has its bearings in a frame or standard, $b^6$, and has attached to it a crank, $c$, which, by link $c'$, is adjustably connected with the arm 3 of the elbow-shaped bearing-block $c^2$, connected with the yoke $f$ by the sleeve $c^4$.

The block $c^2$ and the connected yoke $f$, having the heavy counter-balance located below the shaft $b$, and both loosely mounted upon the said shaft $b$, receive and support the rotating secondary shaft, $d$, which, at its front end, has a crank, $d^2$, the pin of the crank being marked 2. (See Fig. 3.) The opposite end of shaft $d$ has secured to it a small pinion, $d'$, deriving motion through toothed gear $b'$, which enables shaft $d$ to be rotated many times while the gear $b'$ on shaft $b$ is being rotated but once.

The crank $c$ and link $c'$ move the bearing-block $c^2$ and yoke $f$ about shaft $b$ slowly in the arc of a circle, determined by the throw of the crank $c$, and at a slow speed, and the crank-pin 2 of the crank $d^2$, by means of its engagement with the slot made at the rear of the tool-carrying arm $e$, as shown in Fig. 3 and in dotted lines, Fig. 1, gradually moves the said arm $e$ and its tool $e^2$ backward and forward slowly in the arc of a circle about the fulcrum $e^3$ of the said arm $e$. Such fulcrum is preferably the end of shaft $b$, or a suitable pin or stud connected therewith.

The aim of my invention is not to operate the tool-carrying lever in the usual long arc, as by the vibration of the bearing-block and yoke, they carrying some suitable projection to enter a groove in the tool-carrying arm and move it over an arc equal to the extent of movement of the said block and yoke; but the aim of my invention is to reciprocate this arm $e$ and the tool $e^2$ in a shorter arc and many times while the arm and tool are moving over its longer arc, and this I do by rotating the shaft $d$ so that its crank-pin, having a more rapid movement than crank $c$, and having a shorter throw, reciprocates the tool-carrying arm backward and forward rapidly in short arcs while the arm $e$ is being moved at a slower speed in its usual long arc.

The shaft $b$ is provided with a collar, $g$, which is connected with the shaft $b$ by a short pin entering an annular groove in the said shaft under the collar. This connection permits shaft $b$ to rotate within the collar, but when the collar is moved horizontally it will move the shaft $b$ with it. This collar is pinned to the hand-lever $h$, having its fulcrum on the part $h^2$. The periphery of collar $g$ is made to enter a notch, 4, in the yoke $f$ below the shaft $b$, and as the collar is moved horizontally it moves with it both the shaft $b$ and the yoke, and also the shaft $d$ and tool-carrying arm pivoted at the end of shaft $b$, and permits the workman to move the tool $e^2$ from end to end of the heel, so as to polish or burnish all parts of it.

The shoe-heel $i$, supposed to be attached to a shoe or boot, will be clamped in any suitable manner between the parts 5 6 of the shoe-holding jack, free to be rotated about a horizontal axis by hand. The part 6 is carried by the arm $k$ at the upper end of the slide-bar $k^2$, acted upon at its lower end by the treadle $k^3$, controlled by the workman, who with his foot pushes the arm $k$ up, so as to force the heel $i$ more or less hard against the tool $e^2$.

I claim—

1. In a burnishing-machine, a rotary main shaft, a vibratory yoke, and a tool-carrying arm, combined with a rotary shaft, $d$, arranged in said vibratory yoke and moving with it to reciprocate said tool-carrying arm through a long arc, and provided with a crank-pin connecting with said tool-carrying arm to impart a series of independent or separate rapid vibrations or reciprocations to said tool-carrying arm during its travel over the longer path, substantially as described.

2. A pivotal tool-carrying arm, a main driving shaft, $b$, a yoke, $f$, hung on said shaft and having an arm, 3, mechanism connected to said arm 3 to impart to said yoke a reciprocating or vibratory movement, and a shaft, $d$, having a crank-connection with said tool-carrying arm and borne by the yoke, from which it derives for the tool-carrying arm a reciprocating motion in a long arc, and also derives a secondary rotary movement from the said main driving-shaft to impart a series of short, quick vibrations or reciprocations to said arm during the travel of the latter over its longer path, substantially as described.

3. In a burnishing-machine, the lever $h$, loosely pivoted to the shaft $b$, to cause said shaft, with the tool-carrying arm, to move horizontally while said tool-carrying arm is being reciprocated, substantially as described.

4. The tool-carrying arm, the shaft on which it is supported, and the shaft $d$ and its crank-pin and the bearings for the said shafts, combined with a lever connected with and so as to move the said shafts longitudinally, as described, during their rotation, to enable the burnishing-tool to operate upon the heel from end to end, substantially as set forth.

5. The combination, substantially as shown and described, of a main shaft, $b$, adapted to be rotated, a pivoted yoke, $f$, to which a reciprocating or vibratory movement is imparted, a shaft, $d$, borne by said yoke and deriving a rotary motion from the main shaft, and a pivoted tool-carrying arm connected to said shaft $d$ and obtaining a twofold motion from it, substantially as specified, and for the purpose set forth.

In testimony whereof I have signed my name to this specification in the presence of two subscribing witnesses.

JOHN G. BUZZELL.

Witnesses:
G. W. GREGORY,
B. J. NOYES.